(12) United States Patent
Yamamoto (10) Patent No.: US 11,376,887 B2
(45) Date of Patent: Jul. 5, 2022

(54) HOT-STAMPING FOIL, MANUFACTURING METHOD THEREOF, AND PRINT EQUIPPED WITH LAMINATED OPTICAL DECORATION

(71) Applicant: TOPPAN PRINTING CO., LTD., Tokyo (JP)

(72) Inventor: Hanako Yamamoto, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 182 days.

(21) Appl. No.: 16/654,759

(22) Filed: Oct. 16, 2019

(65) Prior Publication Data

US 2020/0047543 A1  Feb. 13, 2020

Related U.S. Application Data

(63) Continuation of application No. PCT/JP2018/016347, filed on Apr. 20, 2018.

(30) Foreign Application Priority Data

Apr. 21, 2017 (JP) .............................. JP2017-084606

(51) Int. Cl.
*B44C 1/17* (2006.01)
*B32B 37/00* (2006.01)
(Continued)

(52) U.S. Cl.
CPC ............. *B44C 1/1729* (2013.01); *B41M 3/12* (2013.01); *B32B 37/025* (2013.01); *B32B 37/1284* (2013.01)

(58) Field of Classification Search
CPC ....... B44C 1/1729; B41M 3/12; B32B 37/025
See application file for complete search history.

(56) References Cited

U.S. PATENT DOCUMENTS 5,700,550 A  12/1997  Uyama et al.
7,893,005 B2  2/2011  Funada et al.

FOREIGN PATENT DOCUMENTS

JP  7-191595  7/1995
JP  2001-71698  3/2001
(Continued)

OTHER PUBLICATIONS

Partial Supplementary European Search Report dated Dec. 1, 2020, in corresponding European Patent Application No. 18788222.0.
(Continued)

*Primary Examiner* — Michael A Tolin
*Assistant Examiner* — Christopher C Caillouet (57) ABSTRACT

A hot-stamping foil has a carrier that is a base film or a coated base film, and a laminated optical decoration formed on the carrier in a removable manner. The laminated optical decoration includes a laminated optical structure, an anchor layer formed on the laminated optical structure at a side opposite against the carrier, the anchor layer being a mixture of an acid-modified polyolefin and a vinyl chloride-vinyl acetate copolymer, and an adhesive layer which is formed on the anchor layer at a side opposite against the laminated optical structure. The adhesive layer has an adhesive domain containing an acid-modified polyolefin as a major component, and a non-adhesive domain containing a blocking preventing agent as a major component. The blocking preventing agent is one or both of a resin filler and an inorganic filler. A glass transition point of the blocking preventing agent is greater than 60° C.

9 Claims, 6 Drawing Sheets

(51) Int. Cl.
  *B41M 3/12*   (2006.01)
  *B42D 25/29*  (2014.01)
  *B32B 37/12*  (2006.01)

(56) References Cited

FOREIGN PATENT DOCUMENTS

| | | |
|---|---|---|
| JP | 2009-291996 | 12/2009 |
| JP | 2010-240994 | 10/2010 |
| WO | WO 2010/069823 A1 | 6/2010 |

OTHER PUBLICATIONS

International Search Report dated Jun. 19, 2018, in corresponding International Patent Application No. PCT/JP2018/016347.
Written Opinion of the International Searching Authority dated Jun. 19, 2018 in corresponding International Patent Application No. PCT/JP2018/016347.

HOT-STAMPING FOIL, MANUFACTURING METHOD THEREOF, AND PRINT EQUIPPED WITH LAMINATED OPTICAL DECORATION

CROSS REFERENCE TO RELATED APPLICATIONS

This application is a continuation application based on a PCT Patent Application No. PCT/JP2018/016347, filed Apr. 20, 2018, whose priority is claimed on Japanese Patent Application No. 2017-084606, filed on Apr. 21, 2017, the content of which is incorporated herein by reference.

BACKGROUND

A hot-stamping foil has been reported. A method of hot-stamping a hot-stamping foil onto a transfer target has been reported. A transfer target equipped with a laminated optical decoration has been reported. The transfer target equipped with a laminated optical decoration can be obtained by hot-stamping a hot-stamping foil onto a transfer target. In addition, a method of hot-stamping a hot-stamping foil onto a print has been reported. A print equipped with a laminated optical decoration has been reported. The print equipped with a laminated optical decoration can be obtained by hot-stamping a hot-stamping foil onto a print. Examples of prints include paper able to be printed upon, a polymer film able to be printed upon, printed paper, or a printed polymer film.

A hot-stamping foil is hot-stamped onto a transfer target. The transfer target can be a print. The print can be a security print. The security print is a printing for which a forgery preventing technology is required. A forgery preventing technology is a technology for preventing abuse such as forgery, tampering, and theft of information that is meant to be kept secret or for easily determining whether abuse has occurred. The hot-stamping foil can be a hot-stamping foil that is hot-stamped onto the security print. Examples of security prints include tickets, banknotes, authentication cards, tags, stickers, authentication pages, game cards, gift certificates, certificates, posters, greeting cards, and business cards. The hot-stamping foil is adhered to the surface of the security print for which authentication is required.

There is an increasing demand for application of a hot-stamping foil for preventing forgery in tickets, banknotes, cards, and booklets, posters, generally expensive goods such as luxury goods, and the like. It is known that a hot-stamping foil can be hot-stamped and applied to an article and the like as proof of authenticity. A hot-stamping foil can effectively satisfy such requirements. In addition, when the hot-stamping foil is hot-stamped on the print, it is possible to impart a visual effect with excellent design properties to the print.

In recent years, as one of technologies for exhibiting optical effects in hot-stamping foils, a so-called optical(ly) variable device (OVD) which is an attachable laminated optical decoration using technologies such as holograms and diffraction gratings that can express a three-dimensional image, a special decorative image, and a special color vary using light diffraction, or a multilayer thin film which causes a color shift depending on a viewing angle according to a plurality of inorganic deposition layers with different refractive indexes has been used.

Since an OVD requires advanced production technologies, has unique visual effects, and can be used to determine authenticity at a glance, it is used by being formed on a part or the entire surface of cards, securities, certificates, and the like as an effective forgery prevention unit. In recent years, in addition to security, it has been widely used as an authentication seal that is adhered to sporting goods, computer parts, and software for other electronics, and proves authenticity of the product, and as a sealing sticker that is adhered to the package of such products.

Generally, an OVD is a forgery prevention unit that makes sophisticated forgery difficult and easy to detect. When an OVD is adhered to paper or plastic such as tickets, banknotes, cards, and books, a thermal transfer method is used in many cases in order to make it difficult to replace it. In order to cope with the increasing demand for an OVD which has a laminated optical structure, it is required to improve the throughput of thermal transfer. In order to improve the throughput of thermal transfer, a hot-stamping foil that can be transferred to a transfer target with a small amount of heat is necessary. Therefore, a pressure-sensitive adhesive having strong tackiness and favorable adhesion, and a thermoplastic resin-based hot melt adhesive which can be adhered with a small amount of heat and having a low melting point are used for an adhesive layer of a hot-stamping foil.

However, when a pressure-sensitive adhesive having strong tackiness or a hot melt adhesive having a low melting point is used, there are problems that blocking may occur during storage, a part of the product may stick during storage and generate defects, and the hot-stamping foil may become unusable before transfer. In order to address such problems, an adhesive having a blocking prevention effect has been proposed (for example, refer to Japanese Unexamined Patent Application, First Publication No. 2001-71698, and Japanese Unexamined Patent Application, First Publication No. 2009-291996). In the technologies described in Patent Literature 1 and 2, fillers are added to the adhesive to reduce a contact area between the adhesive layer and the substrate, and thus blocking is prevented.

SUMMARY

A first aspect of the present invention is a hot-stamping foil comprising a carrier that is a base film or a coated base film, and a laminated optical decoration formed on the carrier in a removable manner.

The laminated optical decoration includes a laminated optical structure, an anchor layer formed on the laminated optical structure at a side opposite against the carrier, the anchor layer being a mixture of an acid-modified polyolefin and a vinyl chloride-vinyl acetate copolymer, and an adhesive layer which is formed on the anchor layer at a side opposite against the laminated optical structure.

The adhesive layer has an adhesive domain containing an acid-modified polyolefin as a major component, and a non-adhesive domain containing a blocking preventing agent as a major component. The blocking preventing agent is one or both of a resin filler and an inorganic filler. A glass transition point of the blocking preventing agent is greater than 60° C.

A second aspect of the present invention is a method for manufacturing a hot-stamping foil having a carrier that is a base film or a coated base film, a laminated optical structure formed on the carrier, an anchor layer formed on the laminated optical structure, and an adhesive layer formed on the anchor layer.

This method comprises a carrier preparation step in which the carrier is prepared, a laminated optical structure forming step in which the laminated optical structure is formed, an anchor layer forming step in which the anchor layer is formed by applying and drying an ink for forming an anchor layer, and an adhesive layer forming step in which the adhesive layer is formed by applying and drying an ink for forming an adhesive layer, the ink for forming an adhesive layer being a dispersion solution in which a thermoplastic acid-modified polyolefin is dispersed and a blocking preventing agent is added.

The laminated optical structure forming step includes a lacquer layer forming step in which a lacquer layer is formed by applying and drying an ink for forming a lacquer layer and forming a diffraction grating by an embossing process, an inorganic deposition layer forming step in which an inorganic deposition layer is formed by a deposition of a deposition material; and a coating layer forming step in which a coating layer is formed by applying and drying an ink for forming a coating layer.

A third aspect of the present invention is a print equipped with a laminated optical decoration in which the laminated optical decoration of the hot-stamping foil according to the first aspect is hot-stamped on a print.

DETAILED DESCRIPTION

According to the hot-stamping foil of the present invention, it is possible to achieve resistance for crumple after transfer, blocking prevention during storage, and a preferable aptitude for transfer.

An embodiment of the present invention will be described below with reference to the drawings.

Figure 1:
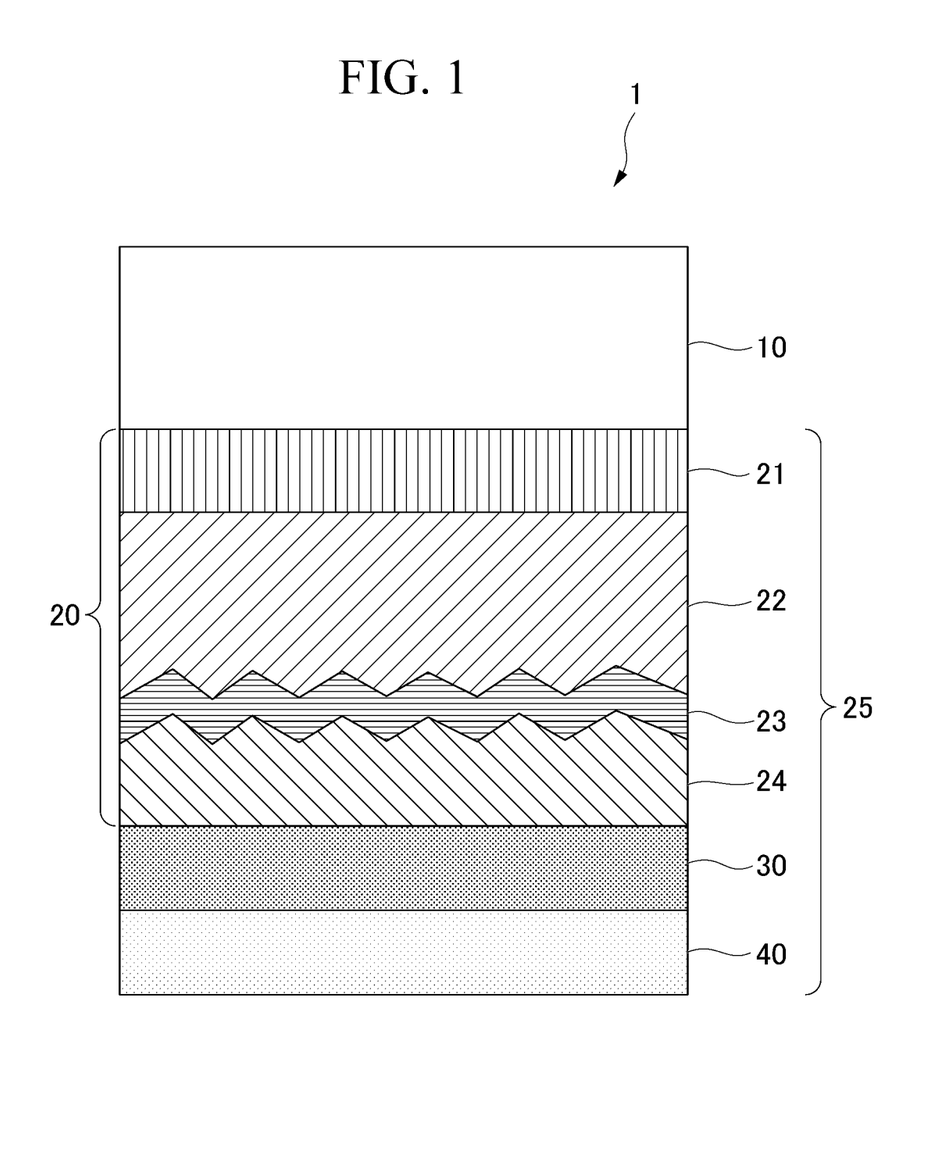
FIG. 1 is a cross-sectional view schematically illustrating a hot-stamping foil.

FIG. 1 is a cross-sectional view schematically illustrating a hot-stamping foil 1. The hot-stamping foil holds a laminated optical decoration 25 in a releasable manner. The hot-stamping foil can transfer the laminated optical decoration 25 to a transfer target by thermal pressing. The hot-stamping foil 1 includes a carrier 10 and the laminated optical decoration 25 formed on the carrier 10. The carrier 10 and the laminated optical decoration 25 are in contact with each other. The laminated optical decoration 25 includes a laminated optical structure 20, an anchor layer 30 formed on the laminated optical structure 20, and an adhesive layer 40 formed on the anchor layer 30. The laminated optical structure 20 and the anchor layer 30 are in contact with each other or a coating layer may be provided therebetween. The anchor layer 30 and the adhesive layer 40 are in contact with each other.

The carrier 10 holds the laminated optical decoration 25 until the hot-stamping foil 1 is thermally transferred to a transfer target. After the hot-stamping foil 1 is thermally transferred to the transfer target, the carrier 10 is released at a boundary with the laminated optical structure 20. In other words, after the hot-stamping foil 1 is thermally transferred to the transfer target, the carrier 10 is released at a boundary with the laminated optical structure 20. The carrier 10 is a base film or a coated base film. The base film can be a single layer or multilayer polymer film. The polymer film can be produced by an extrusion method, a solvent casting method or a calender method. Regarding the extrusion method, an inflation method or a T-die method can be applied. In addition, the polymer film can be an extended or non-extended film. The material of the polymer film can be a thermoplastic or a soluble resin. The thermoplastic can be a polyolefin. The polyolefin may be polyethylene terephthalate (PET), polyethylene naphthalate (PEN), or polypropylene (PP). A polyolefin has appropriate adhesiveness with respect to the laminated optical structure 20. The polyolefin resin can hold the laminated optical structure 20 in a releasable manner. The base film can be a heat-resistant film or a pressure-resistant film. The heat-resistant material and the pressure-resistant material can reduce deformation and deterioration due to heat and pressure applied during transfer. In the coated base film, one surface or both surfaces of the base film are coated. In this coating, a resin alone or a powder-containing resin can be coated. In this coating, micro gravure coating, gravure coating, die coating, or screen coating can be applied. The coating resins can be an acrylic resin, a silicone resin, and a fluorine resin, any copolymer resin of the aforementioned resins, any composite resin of the aforementioned resins, and any composite resin of the aforementioned copolymer resin. The powder contained in the resin can be silica powder, silicone powder, fluorine powder, and carbon powder. When coating is performed on the side of the laminated optical structure, it is possible to adjust holding and releasing of the laminated optical structure. When coating is performed on the side opposite to the laminated optical structure, it is possible to prevent blocking of the laminated optical structure with the adhesive layer, smooth transfer of the hot-stamping foil, or both. The thickness of the base film in the carrier 10 can be, for example, equal to or greater than 4 µm. When the thickness is less than 4 µm, the physical strength as a carrier is insufficient, and it is difficult to handle the hot-stamping foil. The thickness of the carrier 10 can be in a range of 12 to 50 µm.

In addition, depending on the application and purpose, the base film can be paper, synthetic paper, plastic multilayer paper, or resin-impregnated paper.

The laminated optical structure 20 includes a top layer 21, a lacquer layer 22, and an inorganic deposition layer 23 in order from the side of the carrier 10. The lacquer layer 22 is formed on the entire surface on the top layer 21, formed on a part thereof, or omitted. The inorganic deposition layer 23 can be formed on the lacquer layer 22. When the lacquer layer is omitted, the inorganic deposition layer 23 can be formed on the top layer 21. In addition, a coating layer 24 may be provided on the side opposite to the lacquer layer 22 of the inorganic deposition layer 23. A basic configuration of the laminated optical structure 20 is well known, but respective layers will be described below.

The top layer 21 releasably supports the laminated optical structure 20 from the carrier 10. After the hot-stamping foil 1 is transferred, the top layer 21 of the laminated optical structure 20 is positioned on the side opposite to the transfer target, and protects the laminated optical structure from external damage.

The top layer 21 can be a layer containing a thermoplastic polymer and a surface modifier. The thermoplastic polymer of the top layer 21 can be a resin having a glass transition temperature of 90° C. or higher and 130° C. or lower. The thermoplastic polymer can be an acrylic polymer, polyester, a polyamide, and a polyimide, any copolymer of the aforementioned materials, any composite of the aforementioned materials, and any composite of the aforementioned copolymer. The surface modifiers can be powders, waxes, or oils. The powder can be a heat-resistant powder. The heat-resistant powders can be silica powder, polyethylene powder, fluorine powder, and silicone powder. The wax can be paraffin wax, silicone wax, and Carnauba wax. The oil can be a silicone oil. The top layer 21 may be colored. It can be colored by adding a pigment or a dye to the resin of the top layer 21. The pigment can be an inorganic pigment, an organic pigment, and mixtures of the inorganic pigment and the organic pigment. In addition, the pigment can be a fluorescent pigment, a pearl pigment, or a magnetic pigment alone, a blend of the same types, mixtures of different types, and mixture of the different type and the blend of the same type. The dye can be a natural dye, a synthetic dye, and mixtures of the natural dye and the synthetic dye. The dye can also be a fluorescent dye. The top layer 21 can be formed on the carrier 10 by printing or application. The application can be performed by gravure coating, micro gravure coating, or die coating. The printing can be gravure printing and screen printing. The thickness of the top layer 21 can be in a range of 0.5 μm or more and 5 μm or less. The top layer 21 can accept printing thereupon. The acrylic resin easily accepts printing thereupon. The print equipped with a laminated optical decoration having a top layer that can accept printing is able to be printed upon. In the print equipped with a laminated optical decoration having a top layer that can accept printing thereupon, both the laminated optical decoration and the print are able to be printed upon.

The lacquer layer 22 can have an irregular relief structure on one surface or both surfaces of the lacquer layer 22. The lacquer layer 22 can be made of a UV curable resin, a thermoplastic resin, or a thermosetting resin. The UV curable resin can be a curing resin such as monomers, oligomers, or a polymer having an ethylenically unsaturated bond or an ethylenically unsaturated group. The monomer having an ethylenically unsaturated bond or an ethylenically unsaturated group can be 1,6-hexanediol, neopentyl glycol diacrylate, trimethylolpropane triacrylate, pentaerythritol triacrylate, pentaerythritol tetraacrylate, dipentaerythritol pentaacrylate, and dipentaerythritol hexaacrylate. The oligomer having an ethylenically unsaturated bond or an ethylenically unsaturated group can be an epoxy acrylate, urethane acrylate, or a polyester acrylate oligomer or co-oligomer. The polymer can be a urethane-modified acrylic, or epoxy-modified acrylic polymer or copolymer. The UV curable resins can be any of an acrylic resin, an acrylic acrylate resin, an epoxy acrylate resin, a urethane acrylate resin, a polyester acrylate resin, and an ethylene methacrylate resin, any copolymer resin of the aforementioned resins, any composite resin of the aforementioned resins, and any composite resin of the copolymer resin. The lacquer layer 22 may be colored. It can be colored by adding a pigment or a dye to the resin of the lacquer layer 22. The pigment can be an inorganic pigment and an organic pigment. In addition, the pigments can be a fluorescent pigment, a pearl pigment, and a magnetic pigment. The dye can be a natural dye and a synthetic dye. In addition, the dye can be a fluorescent dye.

The thermoplastic resin of the lacquer layer 22 can be an acrylic resin, an epoxy resin, a cellulose resin, and a vinyl resin, any copolymer resin of the aforementioned resins, any composite resin of the aforementioned resins, and any composite resin of the aforementioned copolymer resins. The thermosetting resin of the lacquer layer 22 can be a urethane resin, a melamine resin, an epoxy resin, and a phenolic resin, any copolymer resin of the aforementioned resins, any composite resin of the aforementioned resins, and any composite resin of the copolymer resin. The thickness of the lacquer layer 22 can be in a range of 0.5 μm or more and 30 μm or less.

The relief structure of the lacquer layer 22 has a concave part or a convex part, or a concave part and a convex part. The relief structure has optical properties such as optical diffraction, optical reflection suppression, isotropic or anisotropic scattering, reflection, polarization selectivity, and wavelength selectivity. The optical effect of the relief structure can be detected through visual inspection, machine detection, or the like. Optical properties of the relief structure exhibit effects of forgery tampering prevention or improving design properties. The optical properties can be selected by combining reliefs having one or a plurality of optical effects.

According to the relief structure of the surface of the lacquer layer 22, the laminated optical structure 20 has optical functions such as diffraction, optical reflection suppression, isotropic or anisotropic light scattering, refraction, polarization and wavelength selective reflection, and transmission, and optical reflection suppression. When an area of a diffraction grating structure is provided as the relief structure of the lacquer layer 22, the laminated optical structure 20 can obtain a light diffracting property according to the relief structure. The pitch of the diffraction grating structure can be in a range of 0.5 μm or more and 2 μm or less. The depth of the diffraction grating structure may be in a range of 0.05 μm or more and 0.5 μm or less. When a moth-eye structure or a deep lattice structure is provided on the lacquer layer 22, the laminated optical structure 20 can obtain optical reflection suppression properties, polarization and wavelength selective reflection, transmission, and optical reflection suppression according to the relief structure. When an area of a scattering structure in which a plurality of linear portions or a plurality of dot-like portions are arranged non-periodically is provided on the lacquer layer 22, the laminated optical structure 20 can obtain a property of emitting isotropic or anisotropic scattering light according to the relief structure. The average pitch of the scattering structure can be 0.5 μm or more and 3 μm or less. The depth may be 0.05 μm or more and 0.5 μm or less. When an area of a mirror structure is provided on the lacquer layer 22 to have a different refractive index from an adjacent layer, the relief structure imparts a reflection property to the laminated optical structure 20. The average pitch of the mirror structures can be larger than 3 μm and 30 μm or less. The depth can be deeper than 0.5 μm and shallower than 20 μm. Optical properties of the laminated optical structure 20 can be perceived and detected through visual inspection or machine detection. Therefore, it is possible to improve forgery tampering prevention properties and design properties. The relief structure of the surface of the lacquer layer 22 may have a plurality of relief structure areas. One relief structure area or a plurality thereof in combination can display an image. The images can be a picture, a photo, a portrait, a landmark, a mark, a logo, a symbol, or a combination thereof.

An inorganic deposition layer 23 has a function of enabling the optical effect generated in the lacquer layer 22 to be easily observed.

The inorganic deposition layer 23 is formed on a part or the entire surface of the lacquer layer 22. When the inorganic deposition layer 23 is formed on a part of the lacquer layer 22, since a more advanced processing technique is required for producing the laminated optical structure 20 and a more elaborate design is provided, the hot-stamping foil 1 can have a stronger forgery prevention effect.

The inorganic deposition layer 23 enables the optical properties generated in the lacquer layer 22 to be easily observed. The inorganic deposition layer 23 may display structured colors. The structured color is, for example, a color due to interference. In some cases, the structured color varies depending on an observation angle or an illumination angle. Examples of structured colors include iridescent colors and high saturation color. A material of the inorganic deposition layer 23 can be individual metals or silicon, an alloy, and combinations thereof. The metals or silicon constituting a single substance, an alloy, or combinations thereof can be any of Si, Al, Sn, Cr, Ni, Cu, and Ag and any combination thereof. The thickness of the inorganic deposition layer 23 can be in a range of 10 to 500 nm. The inorganic deposition layer can be formed by depositing an inorganic material under a reduced pressure. The inorganic deposition layer 23 can be deposited by vacuum deposition, sputtering, or CVD.

The inorganic deposition layer 23 is a single layer or multiple layers. The multilayer inorganic deposition layer 23 can be formed by alternately laminating a metal alone and a metal compound, by alternately laminating different metals alone, or alternately laminating different metal compounds. The inorganic deposition layer 23 obtained by alternately laminating individual metals and a metal compound is, for example, multiple layers in which a silicon dioxide layer is laminated on an aluminum layer.

The coating layer 24 covers the entire surface or a part of the inorganic deposition layer 23. The coating layer 24 is provided as a resist on a part of the inorganic deposition layer 23, and the inorganic deposition layer 23 can be provided on a part of the lacquer layer 22 by selectively removing a part of the inorganic deposition layer 23 on which no coating layer is formed. When the inorganic deposition layer 23 is originally provided on a part of the lacquer layer 22, the coating layer 24 may be provided corresponding to the inorganic deposition layer.

When the coating layer 24 is printed, applied, and deposited on the inorganic deposition layer 23, the inorganic deposition layer 23 can be covered with the coating layer 24. Regarding a method of providing the coating layer 24 on a part of the inorganic deposition layer 23, a method in which the coating layer 24 is partially provided by printing, a method in which the coating layer 24 having a different permeability with respect to an etching solution is deposited on the inorganic deposition layer 23, and the coating layer 24 and the inorganic deposition layer 23 are selectively etched due to a difference in permeability with respect to the etching solution, a method in which a resin material that dissolves or is unlikely to be dissolved due to UV light exposure is applied, and after UV light is exposed in a pattern form, the coating layer 24 is developed, and the inorganic deposition layer 23 is selectively etched using an etching solution, or a method in which a soluble resin is partially formed on the inorganic deposition layer 23, the coating layer 24 is then formed, the soluble resin and the coating layer on the soluble resin are partially removed in a solvent can be used. Other various well-known processing techniques may be applied as long as the coating layer 24 is partially provided in the method.

A material of the coating layer 24 can be a resin, an inorganic material and a composite of a resin and an inorganic material. The resin of the coating layer 24 can be a resin having etching resistance. The resin of the coating layer 24 can be a curing resin. The curing resin easily obtains etching resistance. The resin of the coating layer 24 can be any of a vinyl resin, a polystyrene resin, an acrylic resin, a polyurethane resin, a polyamide resin, and a polyimide resin, any copolymer resin of the aforementioned resins, any composite resin of the aforementioned resins, and any composite resin of the aforementioned copolymer resin. The vinyl resins can be vinyl chloride, polyvinylidene chloride, and polyvinyl alcohol. The polystyrene resins can be polystyrene polystyrene, a styrene-acrylonitrile copolymer, polyethylene, and an ethylene vinyl acetate copolymer. The acrylic resins can be polymethyl methacrylate. In addition, resins obtained by copolymerizing at least two types or more thereof may be used. In addition, molecules of the resin may contain an ester bond, a urethane bond, an ether bond, an amine bond, a silanol bond, or the like. A part of a chemical structure of two or more types of resin having functional groups related to such bonds may be cross-linked. The curing resins can be a thermosetting resin such as a urethane resin and an epoxy resin, and a UV curable resin such as an acrylate resin. The resin of the coating layer 24 can be another electron beam curing resin and a moisture curing resin.

The thickness of the coating layer 24 can be in a range of 0.1 μm or more and 5 μm or less.

The anchor layer 30 has a function of improving adhesion between the laminated optical structure 20 and the adhesive layer 40.

The anchor layer 30 is a mixture of an acid-modified polyolefin and a vinyl chloride-vinyl acetate copolymer. The acid-modified polyolefin may be a copolymer of ethylene and an acid component or the like. The copolymers of ethylene and an acid component can be an ethylene(meth)acrylic acid copolymer (EMAA), an ethylene-acetic acid vinyl copolymer, and an ethylene(meth)acrylic acid ester copolymer. The copolymers of ethylene and an acid component easily obtains adhesion with the transfer target due to a synergetic effect of a flexibility of ethylene and adhesiveness of the acid component. The acid value of the acid-modified polyolefin may be in a range of 0.5 to 200. The aforementioned polymers can contain an ester bond, a urethane bond, an ether bond, an amine bond, a silanol bond, or the like. A part of a chemical structure of two or more types of polymers having functional groups related to such bonds may be cross-linked.

The vinyl chloride-vinyl acetate copolymer has favorable adhesion to other resins, and effectively improves the adhesion between the laminated optical structure 20 and the adhesive layer 40. The acid-modified polyolefin of the anchor layer 30 can be a copolymer of ethylene and an acid component. The copolymer of ethylene and an acid component is an ethylene(meth)acrylic acid copolymer (EMAA) or the like. The copolymer of ethylene and an acid component can be an ethylene-acetic acid vinyl copolymer and an ethylene(meth)acrylic acid ester copolymer or the like, beside the ethylene(meth)acrylic acid copolymer. Since the acid-modified polyolefin contains an acid-modified component, it maintains good adhesion with the adjacent laminated optical structure 20 and adhesive layer 40. In addition, since the acid-modified polyolefin generates curing reaction with an organic silane compound and an isocyanate, it can improve adhesion with the laminated optical structure 20. The acid-modified polyolefin of the anchor layer 30 may have a lower softening temperature than a vinyl chloride-vinyl acetate copolymer in the anchor layer 30. The softening temperature of the vinyl chloride-vinyl acetate copolymer of the anchor layer 30 may be equal to or lower than a temperature of a stamper plate surface used in a hot-stamping (Dai face). Since the temperature of the stamper plate surface used in a hot-stamping (Dai face) is generally in a range of 90° C. to 130° C., the softening temperature of the acid-modified polyolefin of the anchor layer 30 can be 60° C. or higher and 130° C. or lower. The softening temperature of the vinyl chloride-vinyl acetate copolymer of the anchor layer 30 can be 60° C. or higher and 130° C. or lower.

The acid component of the vinyl acetate in the vinyl chloride-vinyl acetate copolymer has a high affinity with the acid component of the acid-modified polyolefin. The vinyl acetate has high adhesiveness with the deposition layer and the coating layer. Since the vinyl chloride in the vinyl chloride-vinyl acetate copolymer has a resistance against pressure, it can protect the lacquer layer 22 of the laminated optical structure 20 or the like.

The acid-modified polyolefin and the vinyl chloride-vinyl acetate copolymer may be different in flexibility. The acid-modified polyolefin may have a higher flexibility than the vinyl chloride-vinyl acetate copolymer. When the acid-modified polyolefin has a higher flexibility than the vinyl chloride-vinyl acetate copolymer, the mixture of the vinyl chloride-vinyl acetate copolymer and the acid-modified polyolefin is able to improve the flexibility of the anchor layer 30 due to the acid-modified polyolefin. At the same time, the anchor layer 30 is able to obtain a resistance against pressure due to the vinyl chloride-vinyl acetate copolymer. The flexibilities of each resin component of the anchor layer 30 and the entire anchor layer 30 can be measured by a generally used nano indenter.

The anchor layer may contain a resin component of a kind same as an adhesive domain of the adhesive layer. Specifically, an acid-modified polyolefin in the anchor layer and an acid-modified polyolefin in the adhesive domain of the adhesive layer may be the same kind. For example, when the anchor layer contains an ethylene(meth)acrylic acid copolymer resin, the adhesive layer may also contains an ethylene(meth)acrylic acid copolymer resin. In this case, an adhesion of the anchor layer and the adhesive layer can be improved. The anchor layer may further contain a resin component contained in the adhesive domain of the adhesive layer, thereby a variation in the adhesion of the anchor layer and the adhesive layer is likely to be decreased. The acid-modified polyolefin of the same kind contained in the anchor layer and the adhesive domain of the adhesive layer may be different. For example, an ethylene(meth)acrylic acid copolymer resin contained in the anchor layer and an ethylene(meth)acrylic acid copolymer resin contained in the adhesive layer may be different in a glass transition temperature.

The anchor layer 30 may contain a silane coupling agent. When the anchor layer 30 contains a silane coupling agent, it is likely to obtain adhesion due to a silanol bond generated at a contact surface of the anchor layer 30 and the inorganic deposition layer 23 of the laminated optical structure 20. It leads to improve a stability in adhesion of the laminated optical structure 20 and the anchor layer. In addition, a heat resistance and a solvent resistance of the anchor layer 30 are also improved. When a portion of the anchor layer 30 contacts the lacquer layer 22 of the laminated optical structure 20, an adhesion of the lacquer layer 22 and a silane compound is improved also at their contact surface.

The anchor layer 30 may be made of molecules having a urethane bond. When the anchor layer contains an isocyanate, the anchor layer obtains the urethane bond. When the anchor layer 30 contains an isocyanate, the urethane bond is generated at portions where the anchor layer 30 contacts lacquer layer 22 or the coating layer 24. The adhesion of the anchor layer 30 and the layers which contact the anchor layer 30, and the heat resistance and the solvent resistance of the anchor layer or the like can be improved by the urethane bond. The thickness of the anchor layer can be in a range of 0.1 µm or more and 5 µm or less.

Figure 2:
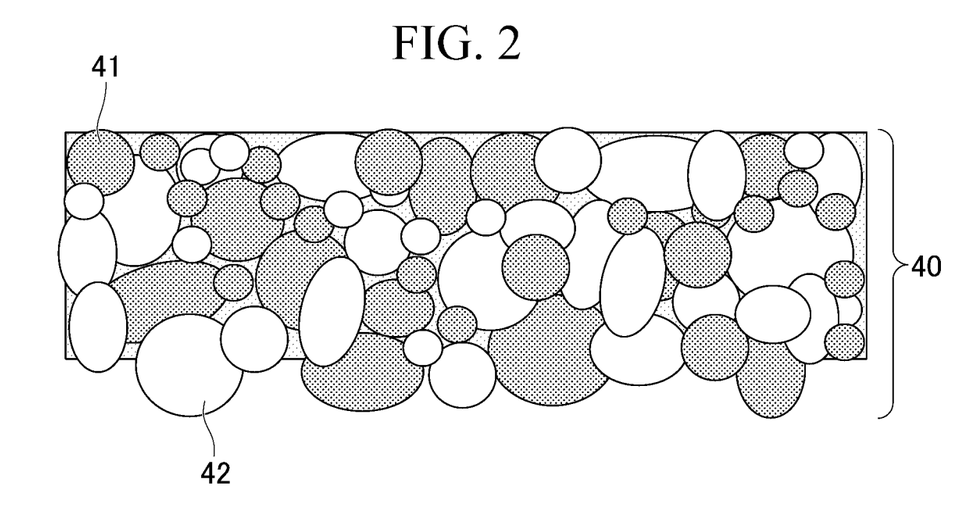
FIG. 2 is a cross-sectional view schematically illustrating an adhesive layer of the hot-stamping foil.

FIG. 2 is a cross-sectional view schematically illustrating the adhesive layer 40 of the hot-stamping foil 1. The adhesive layer 40 has an adhesive domain 41 which is mainly formed of a thermoplastic acid-modified polyolefin, and a non-adhesive domain 42 which is mainly formed of a non-adhesive blocking preventing agent. The thermoplastic acid-modified polyolefin can be adhered to a transfer target. The thermoplastic acid-modified polyolefin and the blocking preventing agent exist in the adhesive layer 40 as a state of partially compatible or an immiscible organic composite. In other words, it is a phase-separation state. The adhesive domain 41 which is plenty of the acid-modified polyolefin and the non-adhesive domain 42 which is plenty of a non-adhesive blocking preventing agent exit on a surface of the adhesive layer 40, the detail thereof will be described later.

The adhesive domain 41 is melted by heat added when the hot-stamping foil is transferred. The adhesive domain 41 plenty of the acid-modified polyolefin adheres to the transfer target by heating.

Fillers can be used as the blocking preventing agent. The blocking preventing agent has a softening point higher than a melting point of the acid-modified polyolefin of the adhesive layer 40. The softening point of the blocking preventing agent may be higher than a temperature of a stamper plate surface (Dai face) during transfer. In this case, the blocking preventing agent does not melt during transfer. When a material which has no softening point is used as the blocking preventing agent, a melting point of the blocking preventing agent has only to be higher than both of the melting point of the acid-modified polyolefin and the temperature of a stamper plate surface (Dai face) during transfer.

Since the adhesive domain 41 and the non-adhesive domain 42 are granular, there is an irregularity on the surface of the adhesive layer 40 before hot-press. The irregularity of the surface of the adhesive layer 40 prevents blocking of the hot-stamping foil 1 during storage.

The adhesive layer 40 can be formed by applying and drying a solution on the anchor layer 30. In the solution, the blocking preventing agent is added to a solution or a dispersion of the acid-modified polyolefin. The blocking preventing agent may be dissolved or dispersed in the solution. The solution can be applied by a known method. Application can be performed by roll coating, reverse roll coating, gravure coating, reverse gravure coating, bar coating, and rod coating. When a dispersion is applied, the adhesive domain 41 mainly formed of the acid-modified polyolefin and the non-adhesive domain 42 mainly formed of the blocking preventing agent are formed on the surface of the formed adhesive layer 40. The irregularity of the surface of the adhesive layer 40 can be formed by these two kinds of domains.

The adhesive layer 40 can be formed by drying at a temperature equal to or lower than the melting point of the acid-modified polyolefin. By such drying, the adhesive layer 40 can be formed maintaining granular shape because the adhesive domain 41 on the surface of the adhesive layer 40 does not completely melt.

The acid-modified polyolefin having melting point of 60° C. to 120° C. can be a main component of the adhesive domain 41. Such adhesive domain 41 melts by a hot-stamping of 0.1 to 1.5 second in which a temperature of a stamper surface (Die face) is 90° C. to 130° C., and can be adhesive to the transfer target. This condition is common in transferring a hot-stamping foil. Since the acid-modified polyolefin has an acid-modified component, it is able to maintain an adhesion to the adjacent anchor layer 30.

The acid-modified polyolefin can be a copolymer or the like. The copolymer can be an acrylic acid copolymer or the like. The acrylic acid copolymer can be an ethylene(meth) acrylic acid copolymer (EMAA) or the like. The acrylic acid copolymer can be a polyester(meth)acrylic acid copolymer. Since the ethylene(meth)acrylic acid copolymer is excellent in solvent resistance, flexibility, and elasticity, it is appropriate as the main component of the adhesive domain 41. The thickness of the adhesive layer 40 can be the greatest in the layers of the hot-stamping foil 1. In this case, since a ratio of the flexible adhesive layer 40 in the hot-stamping foil 1 becomes the greatest, the entire hot-stamping foil 1 becomes flexible and resistance for crumple can be improved, the detail thereof will be described later. Since the ethylene(meth)acrylic acid copolymer has a poor compatibility with other kinds of resins, the non-adhesive domain 42 is positioned between the ethylene(meth)acrylic acid copolymers and the adhesive layer 40 become easily fractured. This decreases a phenomenon (burr) in which a portion of the transferred hot-stamping foil remains outside a transfer area on a transfer target, thus realizing a better aptitude for transfer. The glass transition point of the acid-modified polyolefin such as the ethylene(meth)acrylic acid copolymer of the adhesive layer and the anchor layer may be −30° C. to 30° C. In this case, since the anchor layer sufficiently softens at drying temperature of the applied adhesive layer, it can be possible to form the adhesive domain 41 using a dispersion having particles of a size larger than a thickness of the adhesive layer. The particles of a size larger than a thickness of the adhesive layer contained in the dispersion becomes flat in the adhesive layer, and are likely to contact a transfer target with area of a proper size.

The diameter of the adhesive domain 41 can be 5 µm or more and 50 µm or less. When the diameter is 50 µm or less, the adhesive domains 41 are uniformly dispersed in the dispersion, and the dispersion can be stably applied.

The ethylene(meth)acrylic acid copolymer may contain an acrylic acid ester component for improving flexibility. When the anchor layer also contains the ethylene(meth) acrylic acid copolymer as a major component, the ethylene (meth)acrylic acid copolymers contained in the two layers dissolve each other, and the adhesion of the anchor layer 30 and the adhesive layer 40 strengthens.

A resin filler having a softening point higher than a melting point of the acid-modified polyolefin can be contained in the blocking preventing agent which is a major component of the non-adhesive domain 42. When using the resin filler having a higher softening point than the acid-modified polyolefin, the adhesive domain 41 melts during transfer while the non-adhesive domain 42 does not melt and maintain its granular state. Thus the adhesive layer is properly fractured and burr in transfer can be prevented. A filler having a melting point of 120° C. or higher can be used as the major blocking preventing agent of the non-adhesive domain 42. In this case, the non-adhesive domain 42 does not melt by heat in manufacturing and maintain its granular shape, thereby preventing the adhesive layer to be a complete film shape. It helps the acid-modified polyolefin of the adhesive domain to follow a surface of a transfer target when solidifying after melted, thereby strengthening the adhesion of the adhesive layer 40 and the transfer target. A glass transition point of the resin filler as the major component of the non-adhesive domain 42 is preferable to be higher than a maximum temperature in an ordinary storage of a hot-stamping foil. The maximum temperature in the ordinary storage is 60° C. The glass transition point of the blocking preventing agent of the non-adhesive domain 42 may be higher than 60° C.

When a material having no softening temperature such as an inorganic filler is used as the non-adhesive domain 42, the material only has to have a melting point higher than a melting point of the main component of the adhesive domain 41. In this case, similar advantages as the aforementioned advantages are achieved. A melting point of an inorganic filler is generally higher than a melting point of an acid-modified polyolefin as the main component of the adhesive domain. In this case, the melting point of the inorganic filler may be higher than 60° C. When a material having a melting point higher than a temperature of a stamper surface during transfer is used, adhesion to a transfer target and fracturing can be improved.

The filler can be an inorganic filler, a resin filler, an organic filler, respectively alone or a blend of the same type or different types. Examples of the inorganic filler are silica, calcium carbonate, talc, barium sulfate, mica, aluminum hydroxide, magnesium hydroxide, carbon black, and kaolin clay.

The resin filler can be an acrylic resin, a urethane resin, a polyethylene resin, polypropylene resin, polyvinyl chloride resin, polyvinyl acetate resin, a polystyrene resin, and a low-molecular-weight resin such as a terpene resin, a rosin resin, and a styrene-maleic acid resin. These resins can be used as single and mixture. An example of the organic filler is wood powder. A copolymer can be used as the resin filler. An example of the copolymer is a vinyl chloride-vinyl acetate copolymer resin.

The resin filler can be a dispersion. A diameter of the resin filler in the dispersion can be equal to or smaller than 50 µm in view of stable application. When a material other than resin is used as the filler, the resistance for crumple can be further improved by setting the diameter of the material as 10 µm or less. In this description, the diameter is measured using a laser diffraction and scattering type particle size distribution measuring device (such as Microtrac BlueRay-trac commercially available from Microtrac Bel Corp: measured according to JIS 8825:2013), and refers to the volume average particle diameter. After application, it can be obtained from an area average particle diameter from an observation image taken by an electronic microscope.

The inorganic filler can be nano-sized. The inorganic filler of nano size can be a silica, various kinds of metal, and oxides thereof. A nano silica may be surface-treated. The nano size filler can be 10 nm or more and 1 µm or less. The inorganic filler of nano size may clump together. The diameter of the nano size filler can be obtained as volume average particle diameter using a dynamic light scattering type particle size distribution measuring device (such as Nanotrac Wave commercially available from Microtrac Bel Corp: measured according to JIS 8825:2013). After application, it can be obtained from an area average particle diameter from an observation image taken by an electronic microscope.

The ratio of the major component of the adhesive domain 41 and the blocking preventing agent of the non-adhesive domain 42 can be in a range of 50:1 to 5:1, or a range of 40:1 to 6:1. When the ration is in a range of 50:1 to 5:1, it is likely to obtain the resistance for crumple. The thickness of the adhesive layer 40 can be 0.5 µm or more and 20 µm or less.

The hot-stamping foil 1 is transferred on a transfer target. The transfer target can be a print. The thickness of the print can be in a range of 0.05 mm or more and 4 mm or less. The print can be a polymer film or printed paper of which the entire surface or a part is printed, and a polymer film or printing paper to be printed. A polymer film can be applied to the printed polymer film, and a base film of the polymer film to be printed. The entire surface or a part of the surface of a base film is coated with an anchor layer, and the printed film is printed on the coated anchor layer. High quality paper, medium quality paper, coated paper, uncoated paper, film-laminated paper, resin-impregnated paper, or the like can be used in the printed paper. A polymer film to be printed is a polymer film coated with an anchor layer so that printing is accepted on a base film. High quality paper, medium quality paper, coated paper, uncoated paper, and film-laminated paper are used as the paper to be printed. The entire surface or a part of the surface of the coated paper is coated with an anchor layer. The polymer film can be an extended film and a non-extended film. The extended film and the non-extended film can be a polyester film, a polycarbonate film, a polyethylene film, and a polypropylene film. The polyester film can be made of polyethylene terephthalate or polyethylene naphthalate. The polymer film can have a single layer or multiple layers in which the same materials or different materials are alternately laminated. The printing can be gravure printing, offset printing, flexography, and screen printing. In printing, an ink can be printed. The ink can be a pigment ink, a dye ink, a pearl ink, and an invisible ink. The invisible inks can be a fluorescent ink and an infrared absorption ink. The print as the transfer target can be a security print. The security prints can be banknotes, tickets, tags, stickers, game cards, authentication cards, authentication pages, gift certificates, certificates, posters, greeting cards, and business cards. The security print is printing that requires a measure for preventing abuse such as forgery, tampering, and theft of information that is meant to be kept secret, a measure for easily determining whether abuse has occurred when there is concern of such abuse, or a measure for preventing forgery. In printing, an ink can be printed. The images can be a picture, a photo, a portrait, a landmark, a mark, a logo, and a symbol.

The hot-stamping foil 1 is transferred such that the adhesive layer 40 comes in contact with the transfer target, and after the transfer, the carrier 10 is removed. The anchor layer used in the polymer film to be printed and the printed polymer film can be thermoplastic resin, thermoset resin, and thermoplastic-thermoset resin. A polymer and a copolymer can be used in the anchor layer. The polymer and the copolymer of the anchor layer can be a polyethylene, an ethylene methacrylic acid, a polyethyleneimine, and a polyurethane. According to bonding of the + polar group or the − polar group of polyethyleneimine with the + polar group or the − polar group of the ethylene(meth)acrylic acid copolymer, high adhesiveness with respect to the laminated optical decoration 25 is provided. In addition, the surface of the transfer target can be modified according to a known surface modification treatment. The surface modification treatment of the transfer target provides high adhesiveness with respect to the hot-stamping foil 1. The surface modification treatment can be a corona discharge treatment, a flame treatment, an ozone treatment, a UV light treatment, a radiation treatment, a roughening treatment, a chemical treatment, a plasma treatment, a low temperature plasma treatment and a grafting treatment. The aforementioned transfer targets have a high adhesiveness with the hot-stamping foil 1, and a print equipped with a laminated optical decoration is able to have a high resistance for crumple. The print equipped with a laminated optical decoration can be printed on another laminated optical decoration, another print as a transfer target, or both. A laminated optical decoration can be printable by making a thermoplastic polymer of the top layer to be acrylic polymer or the like. A print can be printable by making a polymer of the anchor layer to be polyethyleneimine or a copolymer thereof. A print equipped with a laminated optical decoration can be formed by a thermal transfer of a laminated optical decoration of a hot-stamping foil to a print. By a thermal transfer of a laminated optical decoration to objects need to prevent forgery such as tickets, banknotes, cards, booklets, and posters, and generally expensive goods such as branded goods and luxury goods, a print equipped with a laminated optical decoration can be obtained. The print equipped with a laminated optical decoration has visual effects having excellent design properties, and can prove its authenticity.

Figure 8:
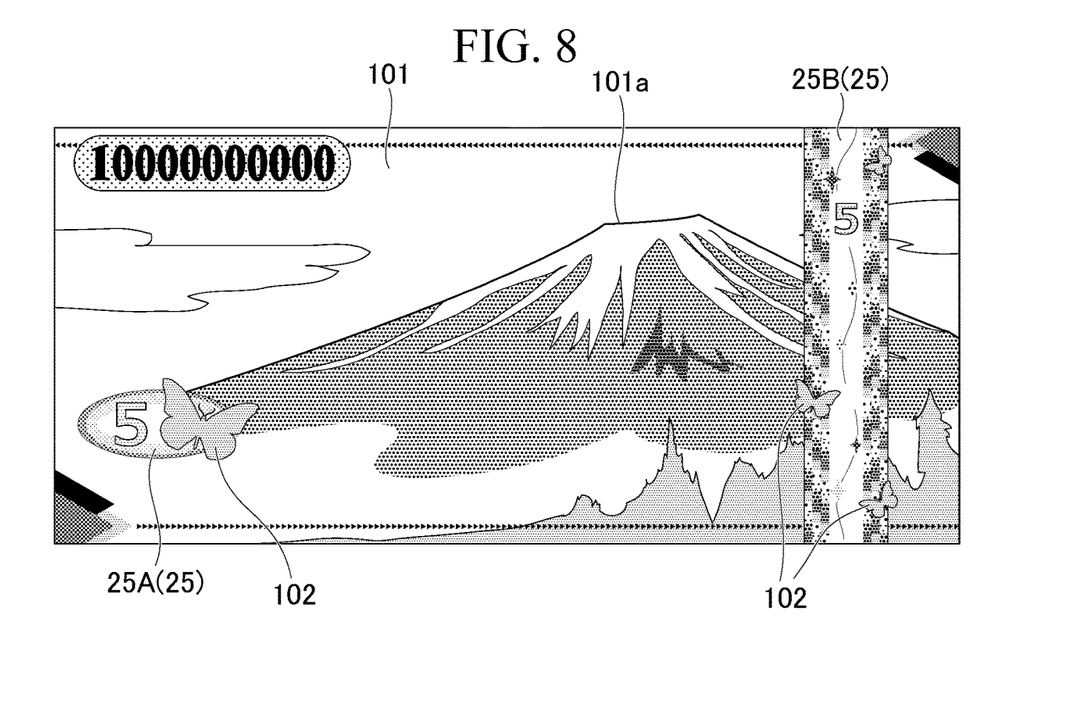
FIG. 8 is a plan view showing an example of a print equipped with a laminated optical decoration.
Figure 9:
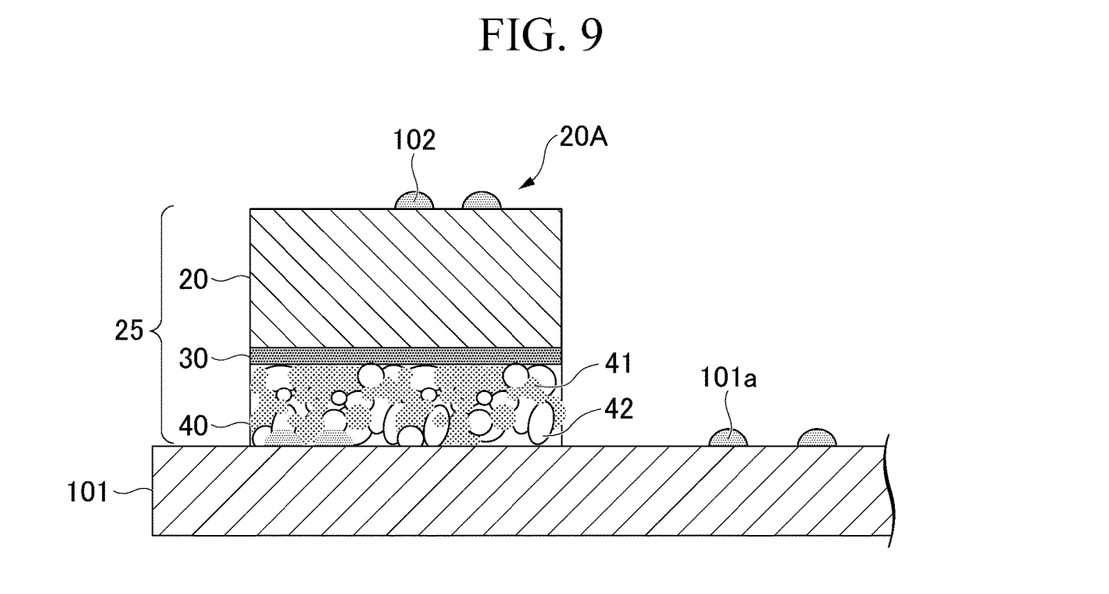
FIG. 9 is a cross-sectional view schematically showing a part of the print equipped with a laminated optical decoration.

FIG. 8 and FIG. 9 show examples of a print equipped with a laminated optical decoration. A print equipped with a laminated optical decoration 100 shown in a plan view in FIG. 8 includes a banknote (print) 101 as a transfer target on which printing 101a is performed and the laminated optical decoration 25 of the hot-stamping foil 1 transferred to the banknote 101. Although two types of laminated optical decoration including a patch-shaped laminated optical decoration 25A and a stripe-shaped laminated optical decoration 25B are transferred to the banknote 101, these are only examples, and only one of them may be used.

FIG. 9 is a cross-sectional view schematically showing a part in FIG. 8. The laminated optical decoration 25A is bonded to the banknote 101 via the adhesive layer 40. The non-adhesive domain 42 in the adhesive layer 40 maintains its granular shape. In the laminated optical decoration 25A, printing 102 is formed on the lower surface of the adhesive layer 40 and the upper surface of the laminated optical decoration 25A. Printing can be performed on any side of the laminated optical decoration.

When the hot-stamping foil 1 is industrially mass-produced, the laminated optical structure 20, an anchor layer 30, and the adhesive layer 40 are formed on the long carrier 10, and thereby the hot-stamping foils 1 are produced in a state where there carriers 10 are connected to each other. Generally, the hot-stamping foils 1 produced in this manner that is wound in a roll shape is stored until it is transferred to the transfer target.

Blocking is a problem generated during storage of the hot-stamping foil. The blocking is a phenomenon in which hot-stamping foils adhere to each other mainly during storage, and if blocking occurs, when the hot-stamping foil wound in a roll shape is unwound, the top layer is released from the carrier, and a part or all of the laminated optical structure remains on the carrier positioned on the lower side (a part which is wound further inside). As a result, a hot-stamping foil in which blocking occurred is defective.

Figure 3:
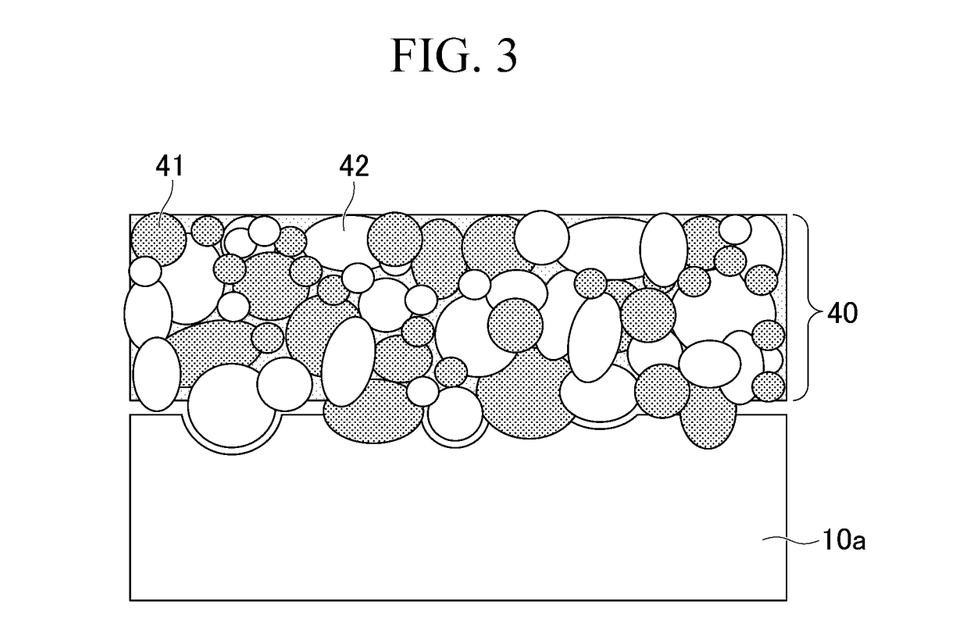
FIG. 3 is schematically illustrating a contact of the adhesive layer containing anti-blocking agent and a transfer target.

FIG. 3 is a diagram schematically illustrating a contact of the adhesive layer 40 of an embodiment of the present invention, which contains the non-adhesive domain 42, and the carrier 10a. A blocking occurs in vertically stacked hot-stamping foils when the adhesive layer 40 of the upper hot-stamping foil strongly adheres to the carrier 10a of the lower hot-stamping foil. In an embodiment of the present invention, the adhesive layer 40 contains the non-adhesive domain 42 which has a softening temperature or a melting point higher than a melting point of an acid-modified polyolefin. This enables the non-adhesive domain 42 to maintain its granular form after application and dry of the adhesive layer 40. Since the granular non-adhesive domain 42 exists in the adhesive layer 40, contact area of the carrier 10a and the acid-modified polyolefin which is an adhesive component of the adhesive layer 40 is decreased. It is thought to lead an effective prevention of the blocking by weakening the adhesion between hot-stamping foils. The blocking can be more effectively prevented by using more than two kinds of blocking preventing agent having different diameters as the non-adhesive domain 42 added to the adhesive layer 40.

Though the detail will be described later, an adhesive domain 141 plenty of an acid-modified polyolefin and a non-adhesive domain 142 plenty of a blocking agent exist in the adhesive layer 40 of an embodiment of the present invention. Since the acid-modified polyolefin exits not in the entire adhesive layer 40 but unevenly locates in the adhesive layer 40, the contact area of the carrier 10a and the acid-modified polyolefin which is an adhesive component of the adhesive layer 40 is decreased. It is thought to lead an effective prevention of the blocking by decreasing the adhesion between the adhesive layer 40 and the carrier 10a when hot-stamping foils are stacked.

Several measures other than the aforementioned are also thought to prevent blocking. The measures are such as follows: decreasing adhesion between the hot-stamping foils by increasing roughness of a surface of the carrier at the opposite side of the laminated optical structure, making the adhesive layer hard to break by forming as a film-shape or contain a component having a high ductility in the adhesive layer. When the adhesive layer is formed as a film-shape, the surface of the adhesive layer becomes flat, and may decrease adhesion to a transfer target after transfer.

Next, actions and an advantages of improving resistance for crumple will be described. When the laminated optical structure is transferred on a transfer target, if a print equipped with a laminated optical decoration on which a laminated optical decoration is transferred is one which is prone to contact water such as a banknote and a security, the adhesion between the adhesive layer and the print as the transfer target is weakened by water. As a result, the laminated optical decoration is fallen off when the print equipped with a laminated optical decoration is bent or pulled, thereby making purposes such as forgery prevention unachievable.

Figure 4:
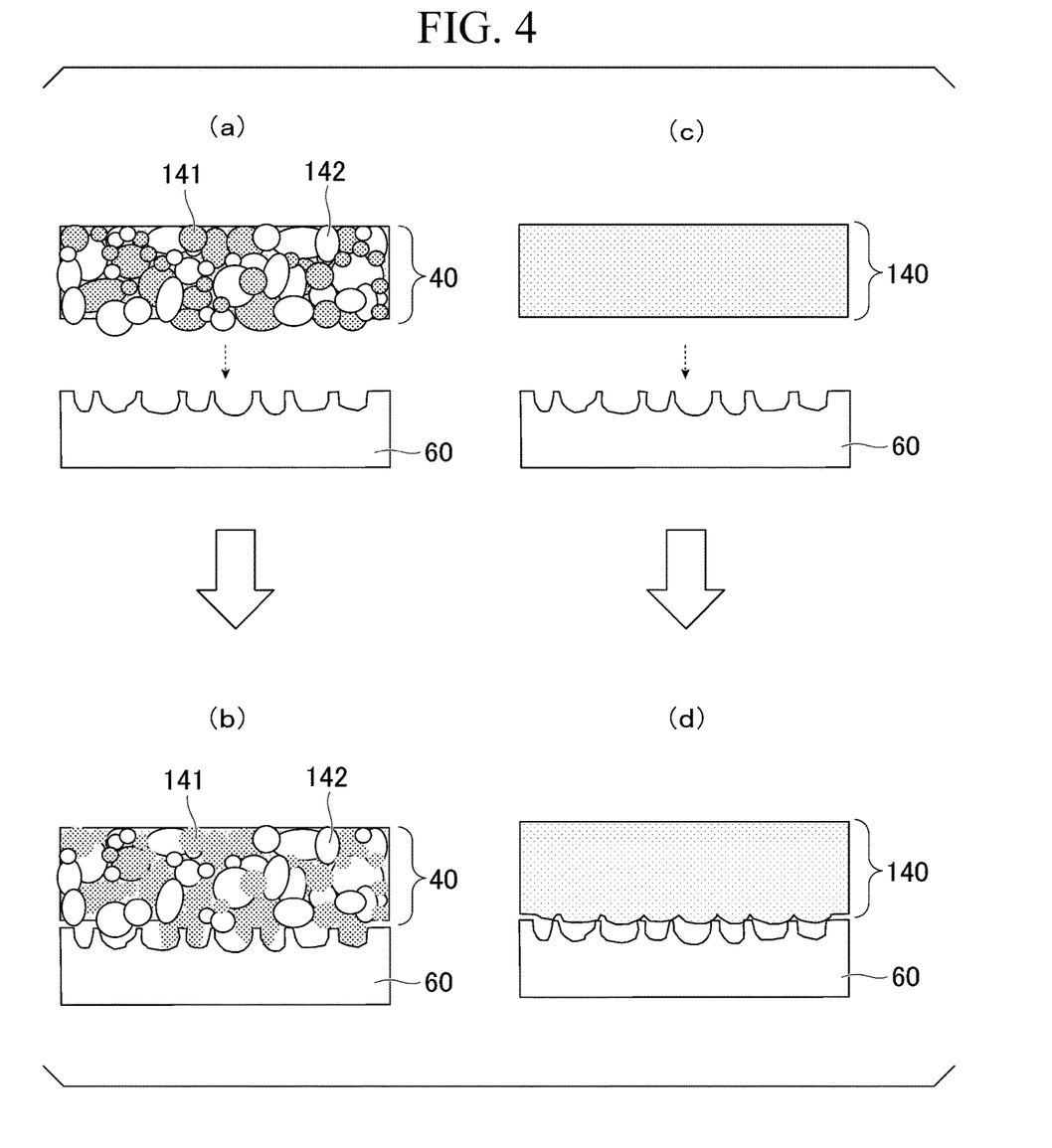
FIG. 4 is schematically showing the contact of the adhesive layer and the transfer target during transfer.

FIG. 4 is a diagram schematically showing the contact of the adhesive layer and the transfer target during transfer. In the present embodiment of the present invention, the adhesive domain 141 plenty of an acid-modified polyolefin and the non-adhesive domain 142 plenty of a blocking agent exist in the adhesive layer 40. Since the melting point of the acid-modified polyolefin is lower than the temperature during transfer, the acid-modified polyolefin melts during transfer. The adhesive domain 141 melts by the heat during transfer and solidified along an irregularity on a surface of a transfer target after melting, thereby adhering strongly with the transfer target. The resistance for crumple is thought to be improved by the solidification of the acid-modified polyolefin along the irregularity on the surface of the transfer target. The laminated optical decoration in the print equipped with a laminated optical decoration of the embodiment is hard to fall of even if contacting water.

As shown in (a) in FIG. 4, when the acid-modified polyolefin is flexible such as ethylene(meth)acrylic acid copolymer, the adhesive domain 141 becomes flexible. Accordingly, when the adhesive layer is hot-pressed on the transfer target 60 during transfer, the adhesive domain 141 deforms along the irregularity on the surface of the transfer target 60 and deeply enters in the irregularity. After heated, the acid-modified polyolefin is thought to solidify, deeply entering inside of the irregularity. Thus, compared with a case in which an acid-modified polyolefin less flexible than the ethylene(meth)acrylic acid copolymer is used, it is able to obtain a stronger adhesion and good resistance for crumple.

In a case where the blocking preventing agent melts in a process forming the adhesive layer due to its low melting point, the acid-modified polyolefin and the blocking preventing agent dissolves with each other in the adhesive layer 140, and the entire adhesive layer becomes film and the surface thereof becomes flat as shown in (c) of FIG. 4. In this case, the adhesive layer is hard to enter inside of the irregularity when the adhesive layer 140 is hot-pressed on the transfer target 60, as shown in (d) of FIG. 4. As a result, the acid-modified polyolefin is hard to be introduced in the irregularity. Thus, the adhesion tends to be weak and may deteriorate the resistance for crumple. In addition, when acid-modified polyolefin and the blocking preventing agent dissolves with each other, the dissolved material becomes hard to melt because when melting point becomes higher. Thus, the adhesion tends to be weak and may deteriorate the resistance for crumple. The malting point or the softening temperature of the major component of the adhesive domain can be higher than 40° C. The malting point or the softening temperature of the blocking prevention agent of the non-adhesive domain can be higher than 40° C. Since the drying temperature after the adhesive layer is applied is 40° C. or less, the adhesive domain and the non-adhesive domain in the adhesive layer can maintain their granular shape even after drying.

Figure 5:
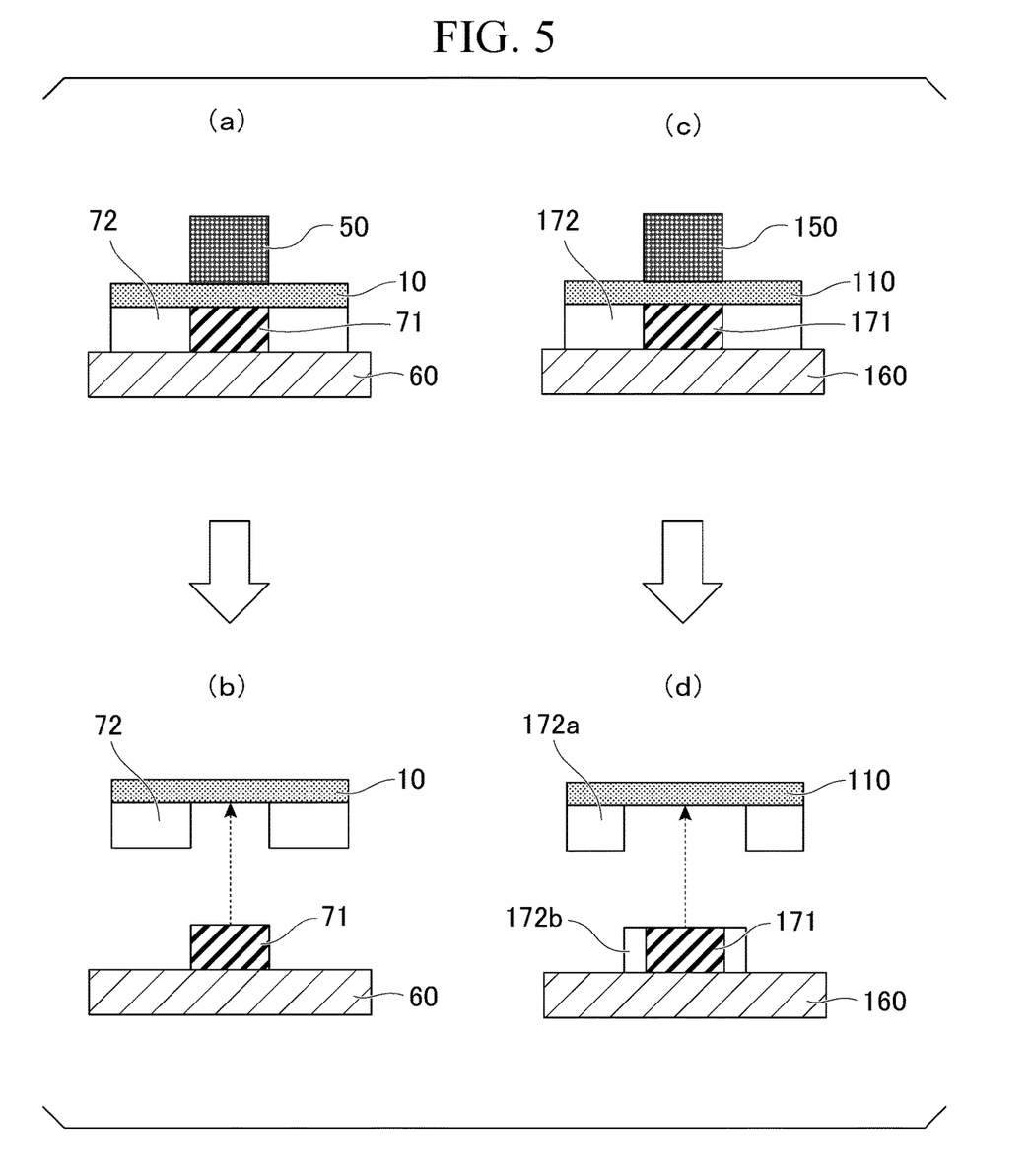
FIG. 5 is schematically showing an aptitude for transfer of the hot-stamping foil.

Actions and an advantages of improving aptitude for transfer will be described. When a hot-stamping is transferred on a transfer target, a transfer area is pressed and hot-stamped by a transfer stamper (Die). FIG. 5 is a diagram schematically showing an aptitude for transfer of the hot-stamping foil when transferred on a transfer target. In FIG. 5, a part of the layer structure of the hot-stamping foil is omitted. In a normal hot-stamping foil, only a laminated optical structure and an adhesive layer 71 in an area which is hot-pressed by the transfer stamper (Die) 50 adheres to the transfer target 60. After the carrier 10 is removed, since an area 72 which is not hot-pressed by the transfer stamper (Die) still adheres to the carrier 10 and removed from the transfer target 60 with the carrier 10. However, when an aptitude for transfer is bad the carrier is removed, a portion 172b of the area which is not hot-pressed by the transfer stamper (Die) may remain on a transfer target 160 as an extruder (burr) from an area 171 where is hot-pressed by the transfer stamper (Die) as shown (d) of FIG. 5, after being hot-pressed by the transfer stamper (Die) as shown (c) of FIG. 5. The rest 172a of the area which is not hot-pressed by the transfer stamper (Die) is removed with the adhered carrier 110. As a result, the laminated optical decoration is not transferred along the shape of the transfer stamper (Die), and becomes defective.

Figure 6:
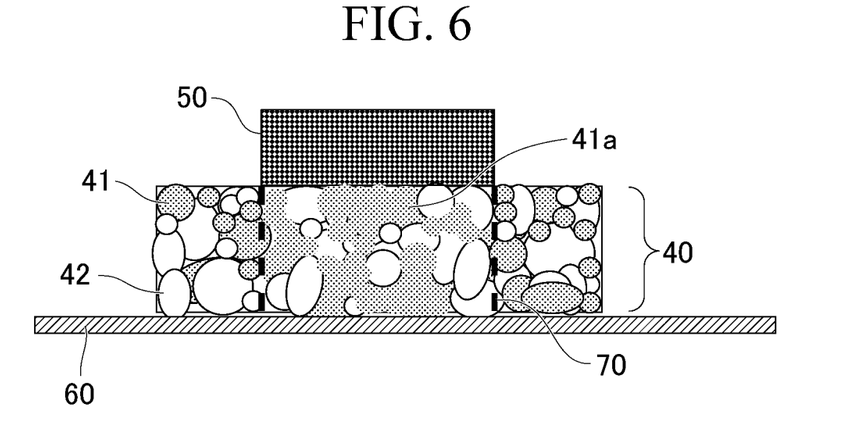
FIG. 6 is schematically showing a mechanism of burr prevention in the hot-stamping foil.

FIG. 6 is a diagram schematically showing a mechanism of burr prevention in the present hot-stamping foil. Since the melting point of the thermoplastic acid-modified polyolefin as a main component of the adhesive domain 41 of the adhesive layer is 60° C. or more and 120° C. or less, and higher than the temperature during transfer, the adhesive domain 41 in an area which is hot-pressed by the transfer stamper (Die) melts during transfer. Since the melted acid-modified polyolefin 41a forms an adhesive film in the adhesive domain, the resistance for breaking is improved in the adhesive domain after transfer. On the other hand, in a portion which is not hot-pressed by the transfer stamper, none of the adhesive domain 41 and the non-adhesive domain 42 melts. Since only the adhesive domain in the area which is hot-pressed by the transfer stamper has high resistance for breaking, a boundary 70 of the area hot-pressed by the transfer stamper and the area not hot-pressed by the transfer stamper easily breaks, thereby preventing the adhesive layer of the area not hot-pressed by the transfer stamper to remain on the transfer target and preventing burr generation. Since the area hot-pressed by the transfer stamper is breaking resistant, it prevents the transfer area to be lost partially. In addition, since the softening point or the melting point of the blocking preventing agent 42 in the area hot-stamped by the transfer stamper is higher than the temperature during transfer, the blocking preventing agent does not melt during transfer. Thus the non-adhesive domain maintains its granular shape. The non-adhesive domain maintaining granular shape makes the adhesive layer break easily during transfer, thereby improving the transferring characteristics of the hot-stamping foil.

Figure 7:
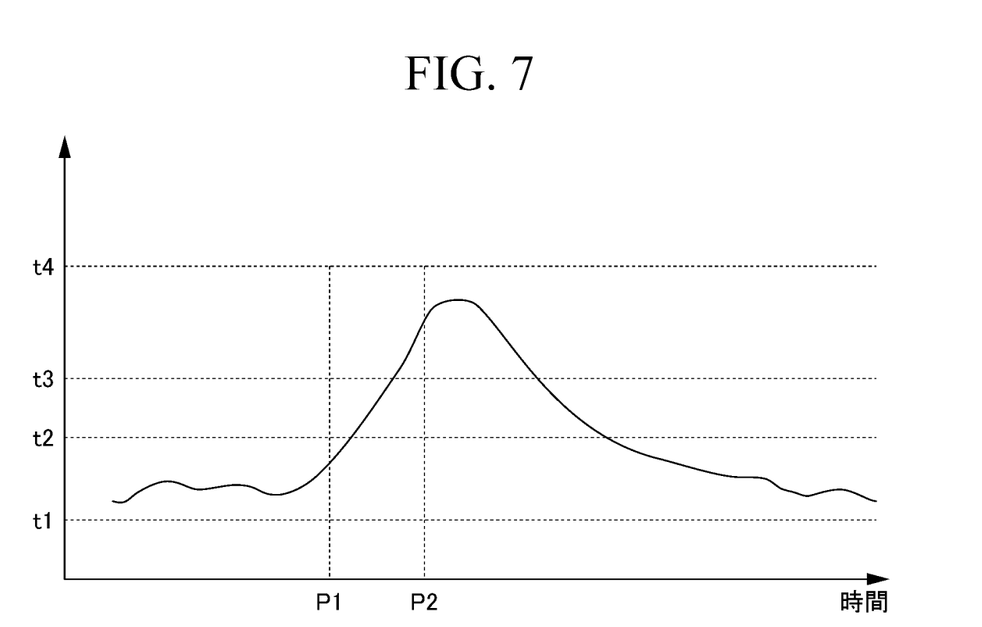
FIG. 7 is a conceptual diagram showing change in the temperature of the hot-stamping foil.

A conceptual diagram showing change in the temperature of the hot-stamping foil 1 is shown in FIG. 7 as a reference. During a storage in which a temperature t is in a range of t1 and t2 shown in FIG. 7, since none of the adhesive layer 41 and the non-adhesive layer 42 softens, blocking is preferably prevented. When a transfer starts at a time P1, the temperature of the hot-stamping 1 rapidly rises to a temperature near a transfer temperature t4 within a period of around a second by the time P2 when the transfer ends. In an initial transfer period in which the temperature t is in a range of t2 to t3 shown in FIG. 7, the adhesive domain 41 softens while the non-adhesive domain 42 does not soften. The non-adhesive domain 42 does not soften and maintains its granular shape even in late transfer period in which the temperature t is in a range of t3 to t4 shown in FIG. 7. As a result, the burr generation is appropriately prevented.

As described above, the present hot-stamping foil 1 makes possible to realize all of the blocking prevention, the resistance for crumple, and the aptitude for transfer which have been difficult, by the configuration of its adhesive layer which includes a blocking additive and a thermoplastic acid-modified polyolefin as a main component of the adhesive domain.

The present hot-stamping foil will be described with reference to examples and comparative examples. The scope of the present disclosure is not limited by a specific content of these examples. In all examples, a transfer target is a print, and the print is one of a printed polymer film, a printed paper, a polymer film to be printed, and a paper to be printed.

Example 1

First, materials of respective layers will be shown. In the following description, "parts" refers to parts by mass unless otherwise specified.
(Carrier)
  PET film (with a thickness of 38 μm) (product name Lumirror commercially available from Toray Industries, Inc.)
(Ink for Forming a Top Layer)
  polyamide imide 19.2 parts
  polyethylene powder 0.8 parts
  dimethylacetamide 45.0 parts
  toluene 35.0 parts
(Ink for Forming a Lacquer Layer)
  urethane resin 20.0 parts
  methyl ethyl ketone 50.0 parts
  ethyl acetate 30.0 parts
(Ink for Forming a Coating Layer)
  vinyl chloride-vinyl acetate copolymer (product name VINNOL E15/45M, tg 73° C. commercially available from Wacker Chemie AG.)
  65.6 parts
  polyethylene resin 2.9 parts
  polyurethane resin 8.2 parts
  dimethylacetamide (DMAC) 23.3 parts
(Ink for Forming an Anchor Layer)
  ethylene(meth)acrylic acid copolymer dispersion solution (Nucrel AN4213C commercially available from Du Pont-Mitsui Polychemicals Co., Ltd. melting point of 88° C., dispersion solvent toluene/ethyl acetate) 47.69 parts
  vinyl chloride-vinyl acetate copolymer (product name VINNOL E15/45M, tg 73° C. commercially available from Wacker Chemie AG) 7.14 parts
  organic silane compound (silane coupling agent) 2.41 parts
  isocyanate 1.41 parts
  ethanol 11.87 parts
  methyl ethyl ketone 15.44 parts
  toluene 14.04 parts
(Ink a for Forming an Adhesive Layer)
  ethylene(meth)acrylic acid copolymer dispersion solution (major component of an adhesive domain)
  (Nucrel AN4213C commercially available from Du Pont-Mitsui Polychemicals Co., Ltd. melting point 88° C., dispersion solvent toluene/ethyl acetate) 75 parts
  modified polypropylene dispersion solution (blocking preventing agent)
  (UNISTOLE R300 commercially available from Mitsui Chemicals, Inc.: melting point 160° C.) 25 parts A method of producing a hot-stamping foil will be described below. The ink for forming a top layer was applied to one surface of the carrier and dried so that the film thickness after drying (dry film thickness) was 1 μm, and thereby a top layer was formed.

Next, the ink for forming a lacquer layer was applied to the top layer and dried so that the dry film thickness was 1 μm, and then a relief structure constituting a diffraction grating was formed on a surface of a lacquer layer using a roll embossing method.

Subsequently, vacuum-deposition was performed on the lacquer layer so that aluminum had a film thickness of 50 nm to form an inorganic deposition layer.

Subsequently, the ink for forming a coating layer was applied to the inorganic deposition layer and dried so that the dry film thickness was 1 μm, and thereby a coating layer was formed.

Accordingly, a laminated optical structure was formed on the carrier.

Then, the ink for forming an anchor layer was applied to the laminated optical structure and dried so that the dry film thickness was 1 to 2 μm, and thereby an anchor layer was formed.

In addition, the ink A for forming an adhesive layer was applied to the anchor layer and dried so that the dry film thickness of the solid content was 4 to 5 μm, and thereby an adhesive layer was formed. A drying temperature was set to 40° C. lower than a melting point of the major component, and a drying time was set to 30 seconds.

Thereby, a hot-stamping foil of Example 1 was produced.

Example 2

A hot-stamping foil of Example 2 was produced in the same method as in Example 1 except that the following ink B for forming an adhesive layer was used in place of the ink A for forming an adhesive layer.
(Ink B for Forming an Adhesive Layer)
ethylene(meth)acrylic acid copolymer dispersion solution (major component of an adhesive domain)
(Nucrel AN4213C commercially available from Du Pont-Mitsui Polychemicals Co., Ltd. melting point 88° C., dispersion solvent toluene/ethyl acetate) 83 parts
silica (blocking preventing agent)
(Sylysia740 commercially available from Fuji Silysia Chemical Ltd) 2 parts
methyl ethyl ketone 15 parts

Example 3

A hot-stamping foil of Example 3 was produced in the same method as in Example 1 except that the following ink C for forming an adhesive layer was used in place of the ink A for forming an adhesive layer.
(Ink C for Forming an Adhesive Layer)
ethylene(meth)acrylic acid copolymer dispersion solution (major component of an adhesive domain)
(Nucrel AN4214C commercially available from Du Pont-Mitsui Polychemicals Co., Ltd. melting point 105° C., dispersion solvent toluene/ethyl acetate) 91 parts
silica (blocking preventing agent)
(Sylysia740 commercially available from Fuji Silysia Chemical Ltd) 1 parts methyl ethyl ketone 8 parts

Example 4

A hot-stamping foil of Example 4 was produced in the same method as in Example 1 except that the following ink D for forming an adhesive layer was used in place of the ink A for forming an adhesive layer.
(Ink D for Forming an Adhesive Layer)
ethylene(meth)acrylic acid copolymer dispersion solution (major component of an adhesive domain)
(Nucrel AN4213c commercially available from Du Pont-Mitsui Polychemicals Co., Ltd. melting point 88° C., dispersion solvent toluene/ethyl acetate) 88 parts
nano silica dispersion solution (blocking preventing agent)
(ORGANOSILICASOL MEK-ST commercially available from Nissan Chemical Corporation) 12 parts

Example 5

A hot-stamping foil of Example 5 was produced in the same method as in Example 1 except that the following ink E for forming an adhesive layer was used in place of the ink A for forming an adhesive layer.
(Ink E for Forming an Adhesive Layer)
ethylene(meth)acrylic acid copolymer dispersion solution (major component of an adhesive domain)
(Nucrel AN4213C commercially available from Du Pont-Mitsui Polychemicals Co., Ltd. melting point 88° C., dispersion solvent toluene/ethyl acetate) 79 parts
nano silica dispersion solution (blocking preventing agent)
(ORGANOSILICASOL MEK-ST commercially available from Nissan Chemical Corporation) 11 parts
vinyl chloride-vinyl acetate copolymer (product name VINNOL E15/45M, tg 73° C. commercially available from Wacker Chemie AG) 2 parts
methyl ethyl ketone 4 parts
toluene 4 parts

Example 6

A hot-stamping foil of Example 6 was produced in the same method as in Example 1 except that the following ink F for forming an adhesive layer was used in place of the ink A for forming an adhesive layer.
(Ink F for Forming an Adhesive Layer)
ethylene(meth)acrylic acid copolymer dispersion solution (major component of an adhesive domain)
(Nucrel AN4213C commercially available from Du Pont-Mitsui Polychemicals Co., Ltd. melting point 88° C., dispersion solvent toluene/ethyl acetate) 44 parts
ethylene(meth)acrylic acid copolymer dispersion solution (major component of an adhesive domain)
(Nucrel AN4214C commercially available from Du Pont-Mitsui Polychemicals Co., Ltd. melting point 105° C., dispersion solvent toluene/ethyl acetate) 44 parts
nano silica dispersion solution (blocking preventing agent)
(ORGANOSILICASOL MEK-ST commercially available from Nissan Chemical Corporation) 12 parts

Example 7

A hot-stamping foil of Example 7 was produced in the same method as in Example 1 except that the following ink G for forming an adhesive layer was used in place of the ink A for forming an adhesive layer.
(Ink G for Forming an Adhesive Layer)
ethylene(meth)acrylic acid copolymer dispersion solution (major component of an adhesive domain)
(Nucrel AN4213C commercially available from Du Pont-Mitsui Polychemicals Co., Ltd. melting point 88° C., dispersion solvent toluene/ethyl acetate) 43 parts
ethylene(meth)acrylic acid copolymer dispersion solution (major component of an adhesive domain)
(Nucrel AN4214C commercially available from Du Pont-Mitsui Polychemicals Co., Ltd. melting point 105° C., dispersion solvent toluene/ethyl acetate) 43 parts
styrene-maleic acid copolymer (blocking preventing agent)
(SMA3000 commercially available from Cray Valley: melting point 125° C.) 5.6 parts
methyl ethyl ketone 8.4 parts

Example 8

A hot-stamping foil of Example 8 was produced in the same method as in Example 1 except that the following ink H for forming an adhesive layer was used in place of the ink A for forming an adhesive layer.
(Ink H for Forming an Adhesive Layer)
acrylic resin(major component of an adhesive domain)
(Olivine commercially available from TOYOCHEM CO., LTD.) 26.93 parts
polyester resin(major component of an adhesive domain)
(PES-310S30 commercially available from TOAGOSEI CO., LTD.) 0.68 parts
anti-foaming agent 0.14 parts
ethylene(meth)acrylic acid copolymer dispersion solution (major component of an adhesive domain)

(Nucrel AN4213C commercially available from Du Pont-Mitsui Polychemicals Co., Ltd. melting point 88° C., dispersion solvent toluene/ethyl acetate) 40 parts
  silica (blocking preventing agent)
(Sylysia740 commercially available from Fuji Silysia Chemical Ltd) 0.77 parts
  nano silica dispersion solution (blocking preventing agent)
(ORGANOSILICASOL MEK-ST commercially available from Nissan Chemical Corporation) 23.53 parts
  methyl ethyl ketone 6.85 parts
  toluene 1.1 parts Example 9

A hot-stamping foil of Example 9 was produced in the same method as in Example 1 except that the following ink I for forming an adhesive layer was used in place of the ink A for forming an adhesive layer.
(Ink E for Forming an Adhesive Layer)
  ethylene(meth)acrylic acid copolymer dispersion solution (major component of an adhesive domain)
(Nucrel AN4213C commercially available from Du Pont-Mitsui Polychemicals Co., Ltd. melting point 88° C., dispersion solvent toluene/ethyl acetate) 91.46 parts
  silica (blocking preventing agent)
(Sylophobic4004 commercially available from Fuji Silysia Chemical Ltd) 0.24 parts
  nano silica dispersion solution (blocking preventing agent)
(ORGANOSILICASOL MEK-ST commercially available from Nissan Chemical Corporation) 0.08 parts
  methyl ethyl ketone 2.2 parts Comparative Example 1

A hot-stamping foil of Comparative Example 1 was produced in the same method as in Example 1 except that the following ink J for forming an adhesive layer was used in place of the ink A for forming an adhesive layer.
(Ink J for Forming an Adhesive Layer)
  ethylene(meth)acrylic acid copolymer dispersion solution (major component of an adhesive domain)
(Nucrel AN4213C commercially available from Du Pont-Mitsui Polychemicals Co., Ltd. melting point 88° C., dispersion solvent toluene/ethyl acetate) 100 parts Comparative Example 2

A hot-stamping foil of Comparative Example 2 was produced in the same method as in Example 1 except that the following ink K for forming an adhesive layer was used in place of the ink A for forming an adhesive layer, and the drying temperature and the drying time was changed.
The drying temperature was set as 120° C., and the drying time was 45 seconds.
(Ink K for Forming an Adhesive Layer)
  ethylene(meth)acrylic acid copolymer dispersion solution (major component of an adhesive domain)
(Nucrel AN4213C commercially available from Du Pont-Mitsui Polychemicals Co., Ltd. melting point 88° C., dispersion solvent toluene/ethyl acetate) 100 parts
The following items of the hot-stamping foils of the examples were evaluated.
(Evaluation of Blocking Under Storage Conditions)
1,000 hot-stamping foils of respective examples cut to a length of 100 mm and a width of 24 mm were arranged in the length direction on the outer peripheral surface of a 100 m PET sheet wound in a roll shape, and a total of 100 m of the hot-stamping foils were wound. These were stored at 60° C. for 24 hours, and additionally stored at room temperature for 12 hours, and the hot-stamping foils were then extracted. The hot-stamping foils stacked in the thickness direction were sequentially separated and evaluated in the following two classifications.
○ (good): the laminated optical structure adhered to the carrier of the lower hot-stamping foil was not observed
x (bad): at least a part of the laminated optical structure adhered to the carrier on the lower hot-stamping foil was observed.
(Evaluation of Burr Prevention During Transfer)
High quality paper with a thickness of about 200 μm was set as a transfer target, hot-stamping foils of respective examples were transferred under conditions of a plate surface temperature of 120° C., a pressure of 0.353 t/cm$^2$, and a pressurization time of 0.3 seconds. Then, the carrier was vertically pulled and removed at a speed of 1 cm per second. Lengths of protrusions (burr) protruding outside a transfer area of the laminated optical structure was measured using remains on the removed carrier. Evaluation was performed as the following two classifications.
○ (good): no burrs (no protrusions or only protrusions of 1 mm or less was seen)
x (bad): burr observed (protrusion longer than 1 mm was seen)
(Evaluation of Resistance for Crumple after Transfer)
High quality paper with a thickness of about 200 μm was set as a transfer target, hot-stamping foils of respective examples were transferred under conditions of a plate surface temperature of 120° C., a pressure of 0.705 t/cm$^2$, and a pressurization time of 0.3 seconds. Then, the transferred hot-stamping foils of respective examples were cut as a size of 67 mm by 67 mm, sunk in a water for 15 minutes, and picked out. A crumpling test of pressing four sides of a sample was performed using the NBS CRUMPLING DEVICE (commercially available from IGT Testing Systems K.K.). A missing ratio of an aluminum portion in each sample after test was measured and evaluated as the following two classifications.
○ (good): no changes (aluminum missing ratio is 5% or less)
x (bad): changed (aluminum missing ratio is greater than 5%)
The results are shown in Table 1.

TABLE 1

|  | Blocking prevention | Resistance for crumple | Aptitude for transfer |
|---|---|---|---|
| Example 1 | ○ | ○ | ○ |
| Example 2 | ○ | ○ | ○ |
| Example 3 | ○ | ○ | ○ |
| Example 4 | ○ | ○ | ○ |
| Example 5 | ○ | ○ | ○ |
| Example 6 | ○ | ○ | ○ |
| Example 7 | ○ | ○ | ○ |
| Example 8 | ○ | ○ | ○ |
| Example 9 | ○ | ○ | ○ |
| Comparative Example 1 | X | ○ | ○ |
| Comparative Example 2 | ○ | X | X |

As shown in Table 1, in the hot-stamping foils of respective examples whose adhesive layer contain an acid-modified polyolefin and a blocking preventing agent being different from the acid-modified polyolefin in melting point, all of the blocking prevention, the resistance for crumple, and the aptitude for transfer was achieved.

On the other hand, in the hot-stamping foils of comparative examples 1 and 2, whose adhesive layer does not contain an acid-modified polyolefin and a blocking preventing agent being different from the acid-modified polyolefin in melting point, it was impossible to achieve all of the blocking prevention, the resistance for crumple, and the aptitude for transfer.

What is claimed is:

1. A hot-stamping foil comprising:
a carrier that is a base film or a coated base film; and
a laminated optical decoration formed on the carrier in a removable manner, wherein
the laminated optical decoration includes:
a laminated optical structure;
an anchor layer formed on the laminated optical structure at a side opposite of the carrier, the anchor layer being a mixture of an acid-modified polyolefin, a vinyl chloride-vinyl acetate copolymer, and an organic silane compound; and
an adhesive layer which is formed on the anchor layer at a side opposite of the laminated optical structure,
the adhesive layer has an adhesive domain containing an acid-modified polyolefin as a major component, and a non-adhesive domain containing a blocking preventing agent as a major component,
the blocking preventing agent is one or both of a resin filler and an inorganic filler, and
a glass transition point of the blocking preventing agent is greater than 60° C.

2. The hot-stamping foil according to claim 1,
wherein a softening point or a melting point of a major component of the blocking preventing agent is higher than a melting point of the acid-modified polyolefin as the major component of the adhesive domain.

3. The hot-stamping foil according to claim 1,
wherein the acid-modified polyolefin of the anchor layer is the same kind as the acid-modified polyolefin of the adhesive domain of the adhesive layer.

4. The hot-stamping foil according to claim 1,
wherein a melting point of the acid-modified polyolefin contained in the adhesive layer is in a range of 60° C. to 120° C.

5. The hot-stamping foil according to claim 1,
wherein the acid-modified polyolefin contained in the adhesive layer is an ethylene(meth)acrylic acid copolymer resin.

6. The hot-stamping foil according to claim 5,
wherein the laminated optical structure has a top layer containing a thermoplastic resin and a surface modifier, and an inorganic deposition layer, in an order from a carrier side.

7. A print equipped with a laminated optical decoration in which the laminated optical decoration of the hot-stamping foil according to claim 1 is hot-stamped on a print.

8. The print equipped with a laminated optical decoration according to claim 7, wherein the print is one of a printed polymer film and a polymer film to be printed.

9. The print equipped with a laminated optical decoration according to claim 7, wherein one or both of the laminated optical decoration and the print has a printing on its surface.

* * * * *